(12) United States Patent
Dushane et al.

(10) Patent No.: US 10,951,750 B2
(45) Date of Patent: Mar. 16, 2021

(54) NETWORKED THERMOSTAT CONTROL FOR DUCTLESS HVAC

(71) Applicants: Steven Dushane, Chatsworth, CA (US); Mustafa Oransel, West Hills, CA (US)

(72) Inventors: Steven Dushane, Chatsworth, CA (US); Mustafa Oransel, West Hills, CA (US)

(73) Assignee: VENSTAR, INC., Chatsworth, CA (US)

( * ) Notice: Subject to any disclaimer, the term of this patent is extended or adjusted under 35 U.S.C. 154(b) by 0 days.

(21) Appl. No.: 15/823,407

(22) Filed: Nov. 27, 2017

(65) Prior Publication Data

US 2019/0141179 A1    May 9, 2019

Related U.S. Application Data

(60) Provisional application No. 62/583,616, filed on Nov. 9, 2017.

(51) Int. Cl.
*H04M 1/725* (2006.01)
*G05B 19/042* (2006.01)
*H04L 12/28* (2006.01)

(52) U.S. Cl.
CPC ...... *H04M 1/72533* (2013.01); *G05B 19/042* (2013.01); *H04L 12/2818* (2013.01); *G05B 2219/2614* (2013.01)

(58) Field of Classification Search
CPC ........... H04M 1/72533; H04L 12/2818; G05B 19/042; G05B 2219/2614
See application file for complete search history.

(56) References Cited

U.S. PATENT DOCUMENTS

| | | | | |
|---|---|---|---|---|
| 7,484,234 B1* | 1/2009 | Heaton | ................ | H04N 5/4403 348/734 |
| 2007/0217650 A1* | 9/2007 | Ota | ................... | H04M 1/72533 382/100 |
| 2009/0262189 A1* | 10/2009 | Marman | ........... | G08B 13/19613 348/143 |
| 2010/0039251 A1* | 2/2010 | Mohebbi | ................. | H04N 5/63 340/501 |

(Continued)

*Primary Examiner* — Said M Elnoubi
(74) *Attorney, Agent, or Firm* — Danner IP Law Firm; Allen D. Danner

(57) ABSTRACT

An apparatus, method and computer program product for controlling wirelessly controlled equipment, such as a ductless air conditioning system. A control module is provided comprising an optical source for generating an optical control signal. The control module enables a smartphone to control wirelessly controlled equipment of the type which is controlled by a remote-control device generating an optical signal. An electrical circuit generates electrical control signals to be coupled to the optical source, wherein the electrical circuit generates the electrical control signals depending on information received from a network connection. A wireless communications module communicates with the smartphone. A mobile application stored in a memory of the smartphone communicates user selections from the smartphone over the network connection to the apparatus to implement transmission of electrical control signals to the control module to cause the control module to cause the optical source to generate the optical control signals to control the operation of the wirelessly controlled equipment.

12 Claims, 7 Drawing Sheets

(56) References Cited

U.S. PATENT DOCUMENTS

| | | | | |
|---|---|---|---|---|
| 2010/0311406 A1* | 12/2010 | Lin | ............. | H04M 11/007 |
| | | | | 455/420 |
| 2013/0258646 A1* | 10/2013 | Wang | ............. | F21K 9/23 |
| | | | | 362/184 |
| 2014/0045482 A1* | 2/2014 | Bisson | ............. | H04W 4/021 |
| | | | | 455/420 |
| 2015/0112667 A1* | 4/2015 | Kozuka | ............. | G10L 15/22 |
| | | | | 704/201 |
| 2015/0181444 A1* | 6/2015 | Hederstierna | ............. | H04W 12/003 |
| | | | | 455/420 |
| 2016/0016834 A1* | 1/2016 | Dahule | ............. | C02F 1/30 |
| | | | | 96/175 |
| 2018/0034953 A1* | 2/2018 | Thompson | ............. | H04N 21/4222 |

* cited by examiner

NETWORKED THERMOSTAT CONTROL FOR DUCTLESS HVAC

CROSS REFERENCE TO RELATED APPLICATIONS

This application claims the benefit of Provisional Patent Application No. 62/583,616, filed Nov. 9, 2017, and entitled IMPROVED NETWORKED THERMOSTAT CONTROL FOR DUCTLESS HVAC, the disclosure of which is hereby incorporated herein by reference.

TECHNICAL FIELD

The invention relates to apparatus and methods for controlling the operation of ductless HVAC systems of the type using an infrared remote control.

BACKGROUND OF THE INVENTION

This section is intended to provide a background or context to the inventions disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Three principal types of air conditioners predominate in the world today. Perhaps the most familiar of these is the window air conditioner, which is mounted in a window and includes a condenser facing into the room to be air-conditioned and a compressor facing the outside. These devices work by pumping a refrigerant in a circuit including the condenser and compressor. More particularly, refrigerant is pumped by a compressor into the input of a fan cooled pipe usually configured in a serpentine configuration in order to efficiently be cooled by a cooling fan. The fan cooled pipe forms the condenser.

The output of the condenser is sent to an expansion valve, which functions to meter the amount of refrigerant ejected from the condenser into the evaporator, which comprises another heated exchange tube. When the refrigerant is ejected into the evaporator, because of the low pressure in the evaporator the refrigerant evaporates, cooling the heat exchange tube which forms the evaporator. A second fan, in turn, blows air to be cooled over the heat exchange tube which forms the evaporator, thus cooling the air in the room. This results in warming the refrigerant in the evaporator.

The warmed, still gaseous, refrigerant in the evaporator is then sent to the compressor where it is compressed into a hot liquid in the condenser, in which it is cooled sufficiently to be ejected into the evaporator to repeat the cycle. In the steady-state, the expansion valve is always open to some extent, and it functions to meter the flow of refrigerant into the evaporator. Depending on the pressure in either the condenser or the evaporator, the expansion valve regulates the flow of refrigerant by varying the size of the passage in the expansion valve through which refrigerant flows from the condenser to the evaporator.

With room air conditioners, a thermostat is generally included and located on the room side of the air-conditioning unit.

A second type of system commonly used in the United States is the central air-conditioning system. In this system, one also employs an evaporator and a condenser. However, the condenser is located outside the home, or other facility to be air-conditioned, and the evaporator is located inside the home. Air is blown over the evaporator and circulated through a duct system, which carries air into the rooms of the house through input vents, while collecting warmer air from the rooms of the house through exhaust fans which are connected by ducts to the central evaporator.

Refrigerant is carried to the evaporator by a first refrigerant pipe, which may be, for example, three meters long. The warmed refrigerant, in turn, is returned to the compressor by a second refrigerant pipe. The advantage of the system is that it allows central control of temperature. The ductwork in such a system may be divided into zones, for example a sleeping zone and a living zone.

With central air conditioners, a thermostat is generally placed in a room inside the living space of the building.

The third approach to implementing an air-conditioning system is to condition a single room by putting the evaporator in the room, for example on a wall near the ceiling with the condenser outside the building (e.g., on the roof or on the ground) while running a pair of refrigerant tubes for circulating refrigerant between the condenser and evaporator. In this case, the expansion valve is placed in the evaporator unit. Such systems are known as ductless systems, or sometimes as mini-split systems.

In a ductless system, a thermostat is generally included with the unit and is thus located inside the room being air-conditioned. In many cases, ductless systems may be controlled by a remote control, using infrared (IR) communication. In addition, the remote control may include a thermostat.

In the case of all three approaches, use of a heat pump, which reverses the cycle, is theoretically possible. However, in practice heat pump capabilities are usually limited to central and ductless systems.

SUMMARY OF THE INVENTION

This section is intended to include examples and is not intended to be limiting. In accordance with the invention, a method and apparatus is provided for controlling a ductless air conditioning system.

In accordance with an aspect of the invention, an apparatus comprises a control module comprising an optical source for generating an optical control signal. The control module enables a smartphone to control wirelessly controlled equipment of the type which is controlled by a remote-control device generating an optical signal. An electrical circuit generates electrical control signals to be coupled to the optical source, wherein the electrical circuit generates the electrical control signals depending on information received from a network connection. A wireless communications module communicates with the smartphone. A mobile application stored in a memory of the smartphone communicates user selections from the smartphone over the network connection to the apparatus to implement transmission of electrical control signals to the control module to cause the control module to cause the optical source to generate the optical control signals to control the operation of the wirelessly controlled equipment.

The network connection may include an Internet connection. The smartphone may be configured to communicate the user selections from the smartphone over the Internet to a cloud server. Cloud server software resident in a memory of the cloud server controls the cloud server in response to command signals, received over the internet from the smartphone, to implement transmission of the electrical control signals from the cloud server over the Internet to the control module to cause the control module to cause the optical source to generate optical control signals to control the operation of the wirelessly controlled equipment.

The wirelessly controlled equipment may be a ductless air conditioning system. The ductless environmental control system can be a pre-existing environmental control system. The apparatus can be retrofittable to the pre-existing environmental control system to enable smartphone control of the pre-existing environmental control system via the transmission of control signals from the cloud server over the Internet to the control module.

In accordance with another aspect of the invention, a method includes controlling an optical source for generating an optical control signal to enable a smartphone to control wirelessly controlled equipment of the type which is controlled by a remote-control device generating an optical signal. Control signals are generated to be coupled to the optical source. The control signals are generated depending on information received from a network connection. The smartphone is communicated with, where a mobile application stored in a memory of the smartphone communicates user selections from the smartphone over the network connection to cause the generation of the electrical control signals to cause generating the optical control signals to control the operation of the wirelessly controlled equipment.

In accordance with another aspect of the invention, a computer program product comprises a non-transitory computer readable storage medium having computer-readable code embodied thereon. The computer-readable code is executable by an apparatus and causing the apparatus, in response to execution of the computer-readable code, to perform at least controlling an optical source for generating an optical control signal enabling a smartphone to control wirelessly controlled equipment of the type which is controlled by a remote-control device generating an optical signal; generating control signals to be coupled to the optical source, wherein the control signals are generated depending on information received from a network connection; and communicating with the smartphone, wherein a mobile application stored in a memory of the smartphone communicates user selections from the smartphone over the network connection to an apparatus to implement transmission of the control signals to cause generating the optical control signals to control the operation of the wirelessly controlled equipment.

BRIEF DESCRIPTION OF THE DRAWINGS

The operation of the inventive networked thermostat control for ductless HVAC systems, which may be air conditioners, heat pumps, and so forth, will become apparent from the following description taken in conjunction with the drawings, in which.

DETAILED DESCRIPTION OF THE PREFERRED EMBODIMENTS

The word "exemplary" is used herein to mean "serving as an example, instance, or illustration." Any embodiment described herein as "exemplary" is not necessarily to be construed as preferred or advantageous over other embodiments.

Detailed Description are exemplary embodiments provided to enable persons skilled in the art to make or use the invention and not to limit the scope of the invention which is defined by the claims.

Figure 1:
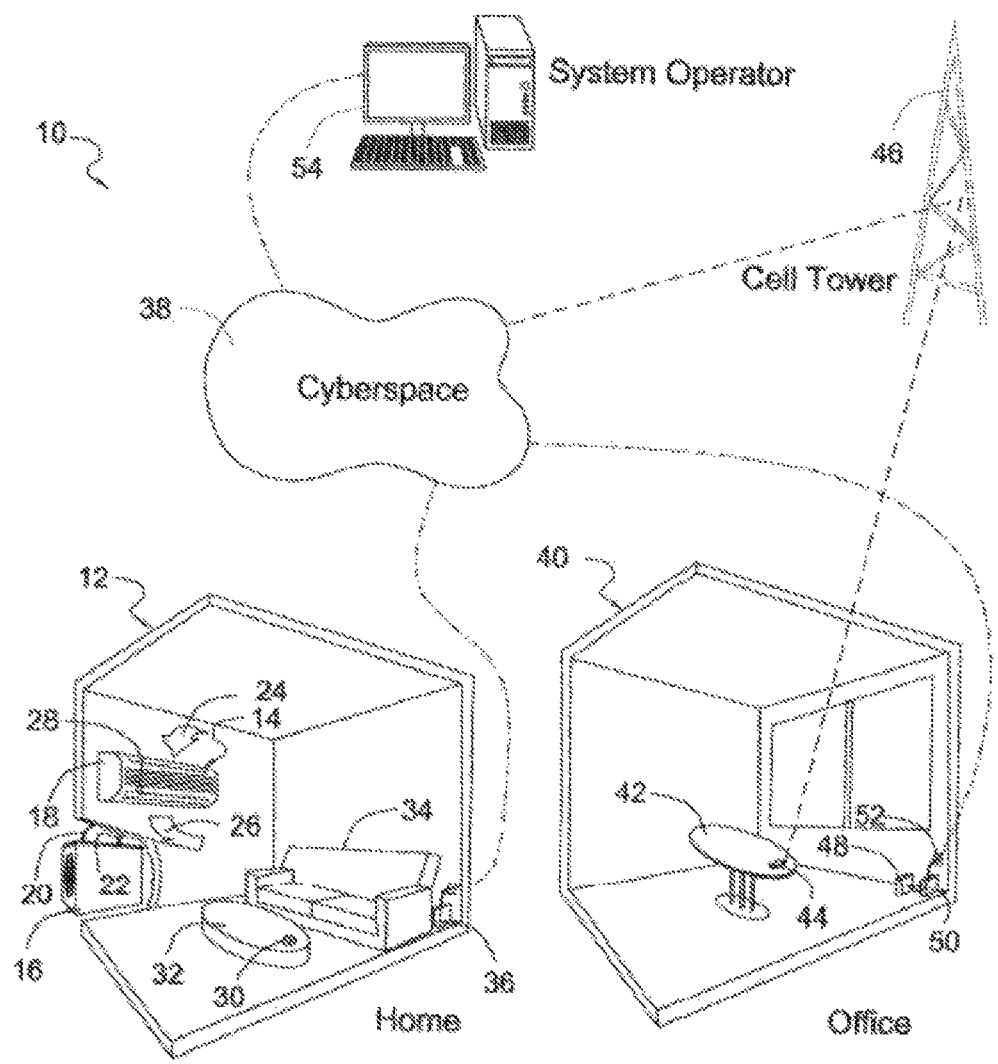
FIG. 1 is a flow chart generally illustrating a system implementing the present invention.

Referring to FIG. 1, the inventive system 10 is illustrated. Part of the illustration is located in, for example, a home 12 to be provided with heating and air-conditioning. The same is achieved through the use of a ductless heat pump system 14. Ductless heat pump system 14 comprises a condenser 16, an evaporator 18, a refrigerant input duct 20 and a refrigerant output duct 22.

During operation, a blower contained in evaporator 18 draws air in the direction of arrow 24, and, after cooling it by passing over the evaporator coils, expels the air into the room and the direction of arrow 26.

The operation of the pump system 14 is controlled by infrared signals provided by a remote-control device. These infrared signals are received by an infrared detector 28. In existing systems on the market today, remote control devices, much like remote control devices for television receivers, stereo systems and the like are commonly employed.

The advantage of the present invention is to retrofit an advanced control system to such existing systems. The same is achieved through the use of the inventive controller 30, which may be placed in any convenient location, such as the top of a coffee table 32. This allows convenient access to an individual, for example, a person sitting on couch 34.

As is more fully below, the inventive controller 30 has a number of controls which may be manually operated by an individual. These controls may be mechanical switches, although touch sensitive switches or any other manually operated interface is suitable. In a particularly preferred embodiment of the invention, a touchscreen may be optionally employed. In addition, controller 30 includes a Wi-Fi transceiver which communicates with a wireless hub 36 that is connected to the Internet 38, for example, by a cable box provided by an Internet service provider.

In addition to control through a manual interface, because control 30 is connected to the Internet 38, a remote control may also be provided by another device connected to the Internet, for example a smartphone, PC, laptop, dedicated Wi-Fi remote control device or a computer server.

In accordance with the invention, it is contemplated that an individual may not be located in the home. For example, the individual may be located in his office 40, perhaps seated at his desk 42, and may access controller 30 through a smartphone 44. Smart phone 44 may be connected to the Internet through a cell tower relay 46. Alternatively, smartphone 44 may be connected to a Wi-Fi hub 48, which is, in turn, coupled to a cable provider box 50 that communicates with the Internet Service Provider ("ISP") through cable 52 for its connection to the Internet 38.

The inventive system is completed by a cloud server 54 which implements control of heat pump 14 by smartphone 44 via the Internet 38. In accordance with the invention, it is contemplated that any network may replace the Internet 38. For example, a local network dedicated to a particular company may provide communications capability to an installation comprising a number of rooms, a number of buildings, or a number of associated complexes. Moreover, in addition to such local network, the Internet may be used to supplement and extend control capabilities.

Figure 2:
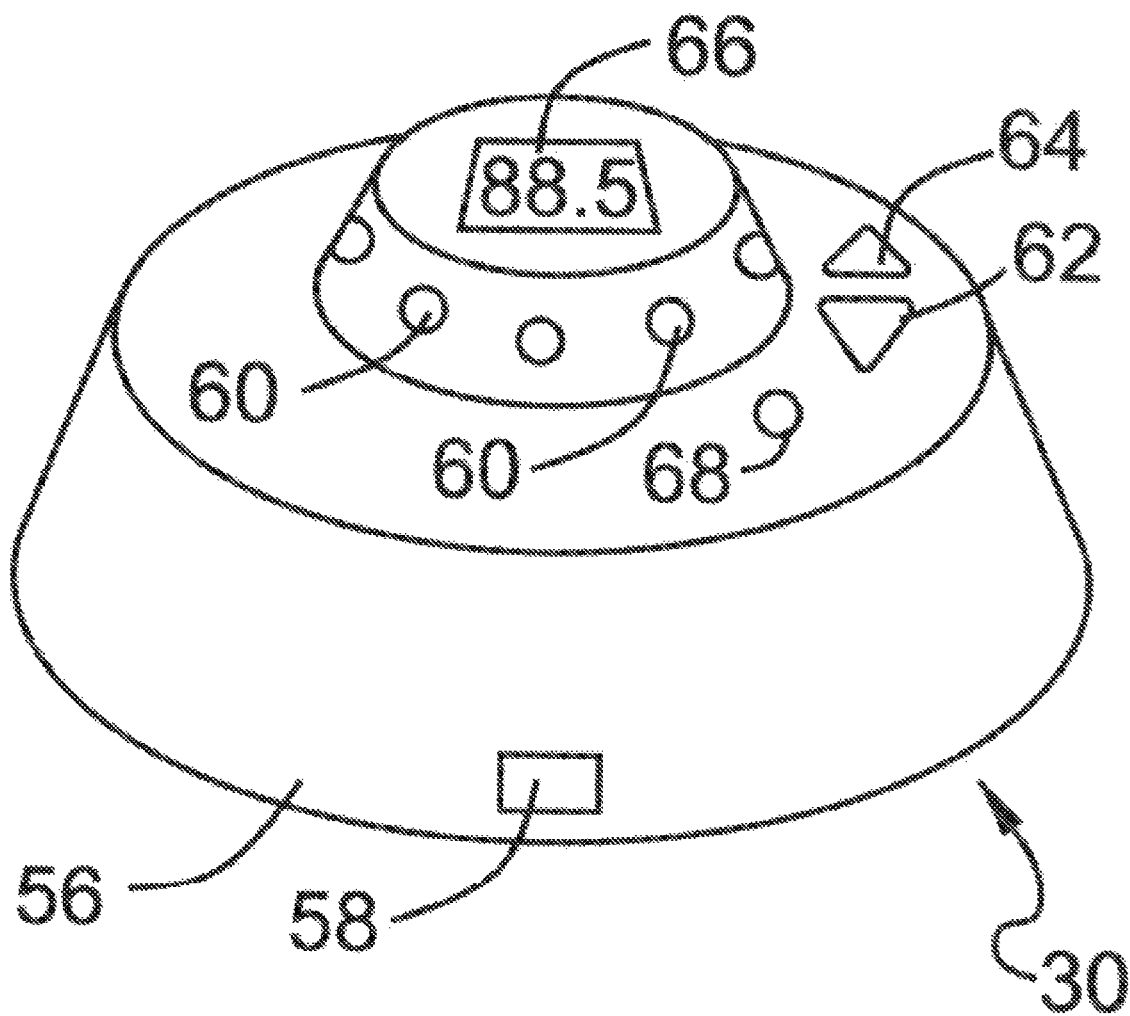
FIG. 2 illustrates an embodiment of a control module in accordance with the present invention in the context of an HVAC controller.

As shown in FIG. 2, controller 30 comprises a base 56. An infrared detector 58 may be used to communicate with the output of the infrared remote control device provided by the manufacturer of heat pump system 14. The purpose of such communication is to program controller 30 with the particular infrared signals needed to control pump system 14. This may be done any one of a number of ways.

In accordance with the invention, it is contemplated that a mobile application downloaded to smartphone 44 presents instructions on the screen of smartphone 44 to instruct the system respecting the inputs needed to control heat pump system 14. For example, the remote control designed for the system may be aimed at infrared detector 58 and the individual instructed to press the various buttons on the remote control associated with various functions such as increased temperature, decreased temperature, turn on fan to high, turn on fan to low, etc. The output of the detector 58 is then communicated via the Internet to the cloud server operated by the organization providing services to the user where the information is stored. Alternatively, such information may be stored locally in smartphone 44.

Another alternative is for housing a library on the cloud server 54 with the infrared signals needed for each type of heat pump, air conditioner, or other HVAC system, and merely asking the user to transmit the model number of the system being used to enable the cloud server 54 to access the correct set of infrared control signals to be sent to infrared detector 28 on the evaporator 14. Such infrared control signals are provided by a plurality of infrared light emitting devices 60.

Temperature control is provided by a pair of buttons, for example mechanical lower temperature and increase temperature push buttons 62 and 64, respectively. A temperature display 66 may be provided. The system may also include a pilot light 68 indicating that the system being controlled is in operation. For example, if the system is an air conditioner, the pilot light will indicate that the air conditioner is operating and cooling the room. Likewise, if the system is a heat pump, the pilot light will indicate that the heat pump is operating. Optionally, pilot light 68 may glow red if the heat pump system 12 is heating, and glow blue if the heat pump system in cooling mode. Likewise, other options may also be provided as detailed below.

Figure 3:
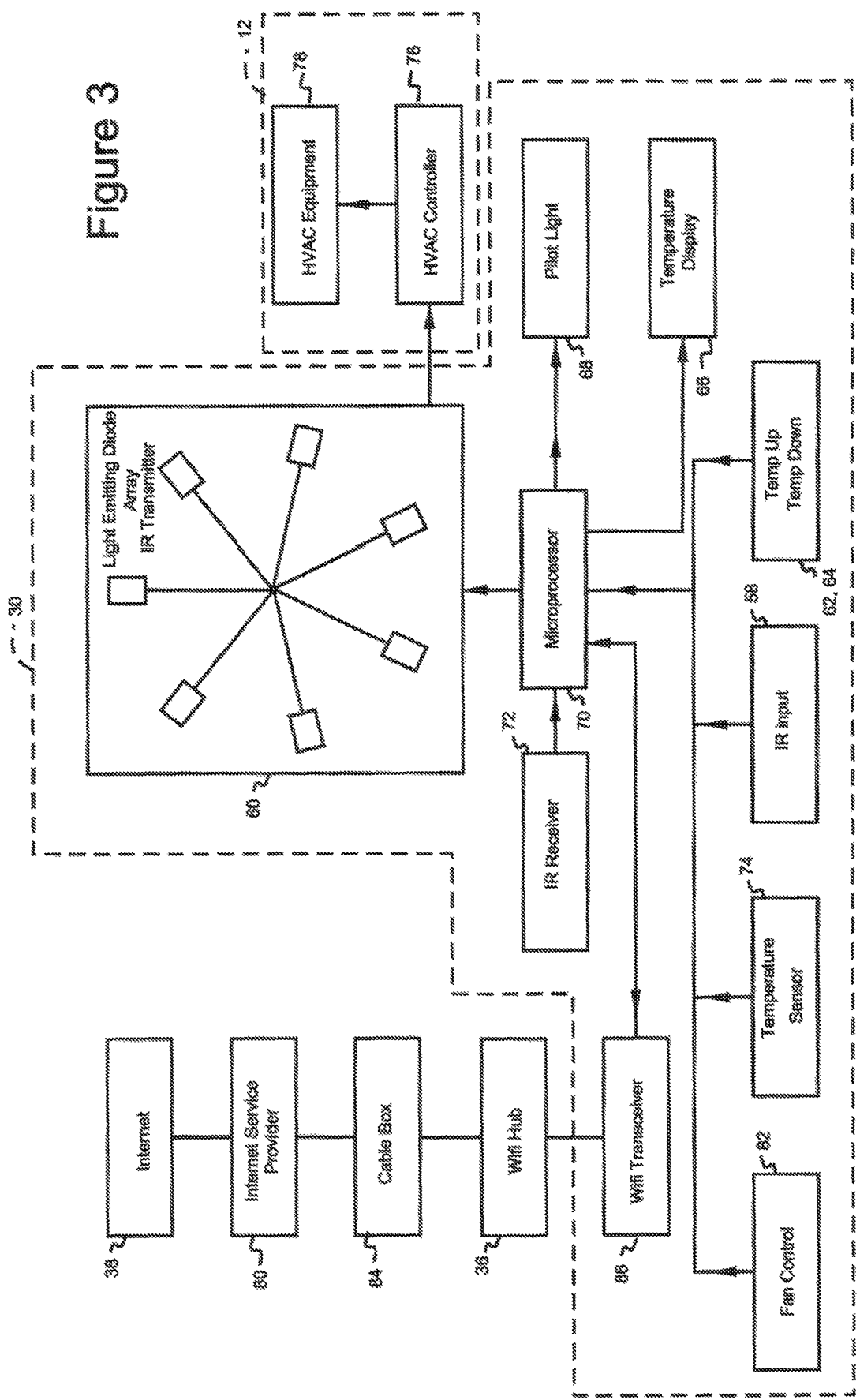
FIG. 3 is a block diagram illustrating an exemplary embodiment of the controller of the present invention in an HVAC control system.

Turning to FIG. 3, the structure of controller 30 may be understood. More particularly, the operation of controller 30 is implemented through the use of a microprocessor 70. Microprocessor 70 is programmed to perform system functions as detailed herein.

Microprocessor 70 is responsive to a number of inputs, including infrared receiver 58, which receives inputs from the infrared remote control supplied by the manufacturer of heat pump system 12. In addition, a second IR receiver or plurality of IR sensitive detectors which function as an IR receiver 72 may be provided to extend the coverage area of a factory supplied infrared control device, when the user is in the room being heated or cooled.

A temperature sensor 74 may be provided within controller 30, and the application provided to the user may enable the selection of the temperature sensor 74 when the user wants to regulate temperature in accordance with the amount of heating and cooling provided at the location of controller 30. Alternatively, the system may be directed to be controlled by a temperature sensor located on the remote control provided by the manufacturer of heat pump system 12.

Likewise, decrease and increase temperature buttons 62 and 64 are coupled to microprocessor 70. Other controls are also possible, such as a fan control 82, which may be used by the user to turn a fan on or off, or to vary the speed of the fan.

In similar fashion, infrared control signals are provided by the ring of light emitting diodes 60. Light emitting diodes 60 transmit infrared control signals to infrared detector 28 on heat pump system 12. Heat pump system 12 comprises an electronic controller 76 which drives heat pump 78.

Control signals are received from the Internet 38 via an Internet service provider 80 through a provider cable box 84. Cable box 84 drives the Wi-Fi hub 36 which communicates with controller 30 by a Wi-Fi transceiver 86 built into controller 30.

Figure 4:
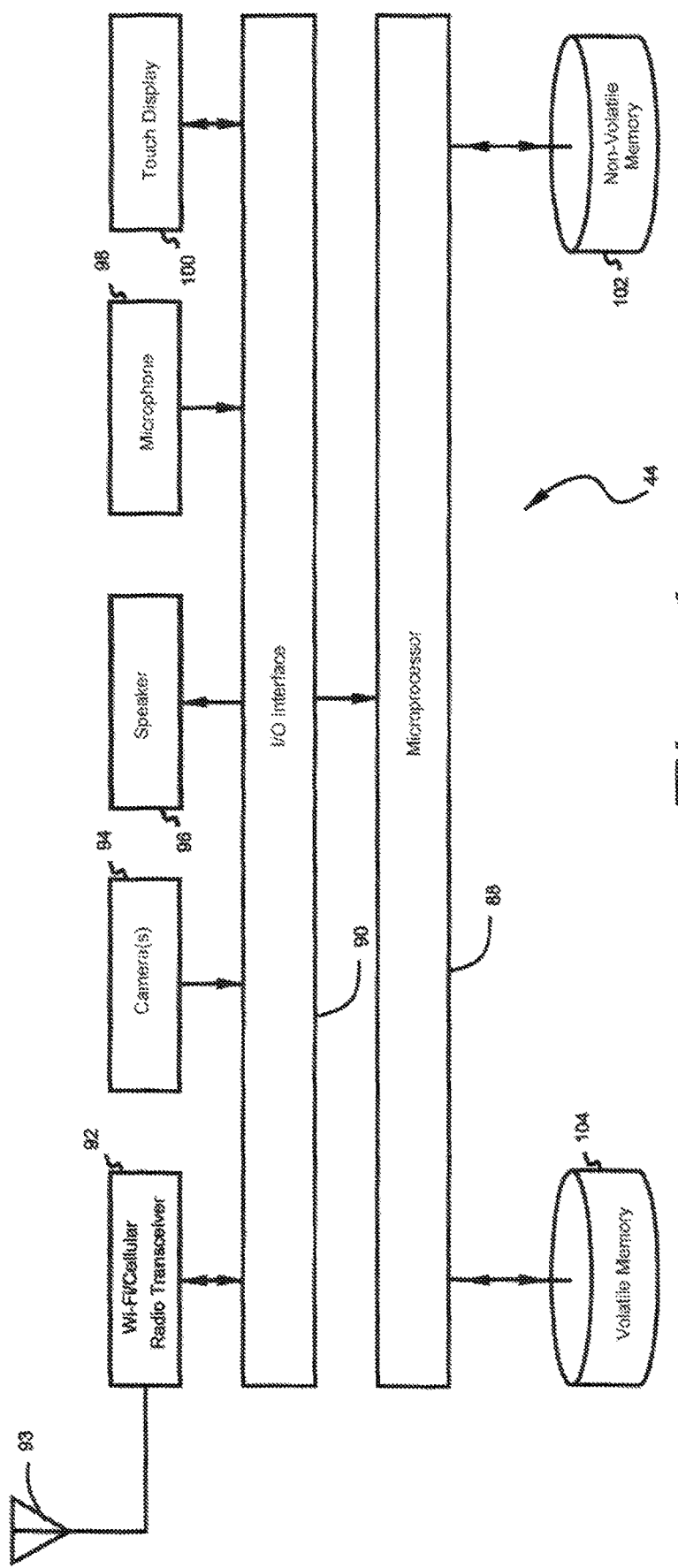
FIG. 4 is a block diagram illustrating an exemplary embodiment of a smartphone of the type useful for implementing the present invention.

The present invention is intended to operate with a conventional smartphone 44. Referring to FIG. 4, smartphone 44 comprises a microprocessor 88 which is coupled via an input/output interface 92 of a number of subsystems. The subsystems include a radio transceiver 92 capable of both Wi-Fi and cellular communication utilizing an antenna 93 (FIG. 4). A camera 94 may be used for security purposes. A speaker 96 may be used to assess communication of information from the cloud server to the user for providing directions in much the same manner as a GPS system in a car. A microphone 98 may receive system inputs. Input into the system may also be implemented through a touchscreen 100.

Operation of controller 30 is achieved by microprocessor 88, using, for example, a downloaded mobile application stored in non-volatile memory 102. Processing during operation of the mobile application is facilitated by volatile memory 104.

Figure 5:
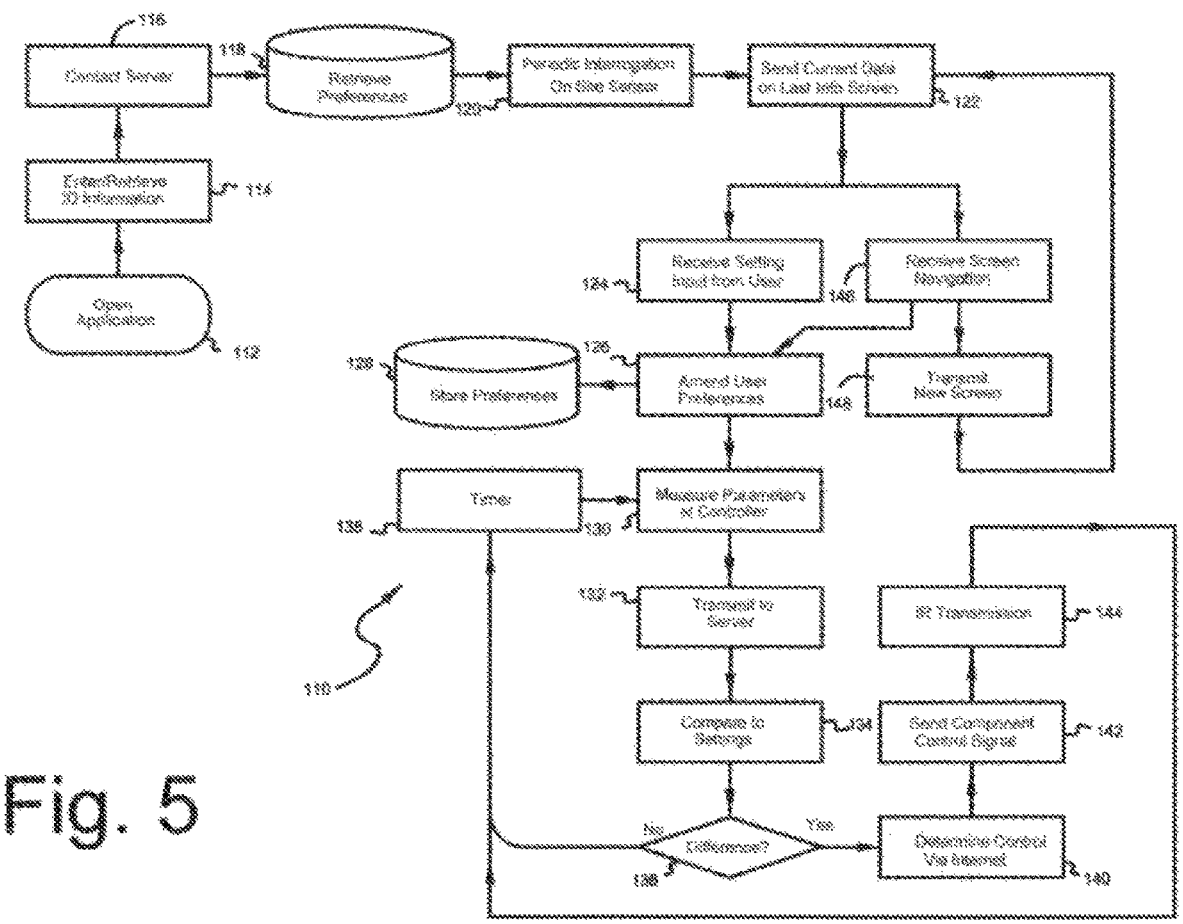
FIG. 5 illustrates a flow chart diagram of the method of the present invention.

The operation of the inventive system may be understood from the flowchart of FIG. 5. The inventive method 110 begins at step 112 with the booting of the inventive temperature control application stored on the smartphone of the user. The user is then asked at step 114 to enter identification information. Alternatively, if the device is known to the system operator, the cloud server 54 will fetch identification information after being contacted at step 116.

At step 118, the cloud server 54 retrieves the preferences of the user. Such preferences include the last screen viewed by the user, temperature settings, controlling temperature detector, and generally all other information entered into the system by the user, as well as all information associated with system, for example system information in the library.

Once operation of the system has been implemented, periodic interrogation of the applicable temperature sensor or sensors is implemented at regular intervals, for example once every minute. Such periodic interrogation occurs at step 120 and regularly as detailed below.

Once the user signs onto the mobile app, at step 122, the user is sent the last interface screen used by the device. If the user decides to change a setting at step 124, the system amends the user preferences at step 126 and stores them at step 128.

The controller 30 then returns at step 130 to its periodic measurement of parameters at the controller or other sensor. Such measurement is sent to server 54 at step 132. At the server, since temperature, for example, is compared to user settings at step 134. Differences are determined and if there is no difference, at step 136 the system triggers a timer 138 which, in turn, after period of time causes the system to measure parameters again at step 130.

On the other hand, if there is a difference between the user's preferred setting and the temperature, or other parameter such as humidity, being measured, at step 140 controller 30 receives a control command over the Internet from server 54. This control is translated into a control signal at step 142. The signal is transmitted at step 144 by infrared emitters 60. The system then returns to timing step 138 to repeat the process.

If, after signing on, the user elects at step 146 to change his screen display, that information is used at step 126 to amend user preferences and store such amended preference at step 128. The system then transmits the new screen at step 148 and fills the field with current data at step 122.

In accordance with the invention, it is also possible to control a duct free split environmental unit without utilizing the Internet, a cloud or even a server. To do this, a mobile application on a Wi-Fi equipped mobile device may directly communicate with the inventive controller 30 through the Wi-Fi network. This enables one to change the temperature setting of the mini-split in a sort of "Wi-Fi direct" mode. This Wi-Fi direct method does not go through the Internet. Rather, it just uses the buildings local network (LAN).

It is further noted that the inventive system will have the inventive controller locally storing IR codes, along with weather locally learned or downloaded from the library in the cloud maintained by the operator of the system. Thus, the inventive controller may then be instructed to control the mini-split from a mobile device such as a smartphone to a communications link whether Wi-Fi direct, the Internet through a local Wi-Fi system, the Internet through the cellular telephone system, and so forth.

The inventive controller also enables integration into environmental, HVAC, local lighting, appliance and related controls currently available on the market, such as those offered under the trademark Surveyor® by Venstar of Chatsworth Calif. The inventive system thus also functions as a bridge using the Internet to bridge to the Surveyor system. In this manner the Surveyor system may be used to manage a building full of mini-splits or any other wirelessly controllable equipment without having to physically attach wires to the HVAC equipment.

Example Operation

Referring to FIG. 6 through FIG. 9, the following description is an example operation of a non-limiting exemplary embodiment of the present invention. The user interface of the inventive system enables simple setup and operation. In general, temperature push buttons 62 and 64, (the warmer and cooler buttons, 62, 64) are used to increase and decrease the desired set temperature. The warmer and cooler buttons have no effect if the "Mode" is set to off. The display 66 will revert back to the room temperature display 66 six seconds after the last button press. A mode button 65 is pressed to select heat or cool operation, or to turn the unit off.

In accordance with an exemplary embodiment, extra functions may be made available via the smartphone app. These extra functions include, but are not limited to, remote control, fan control, vane control, time period scheduling, geofencing, alerts and notifications, home and away settings, weather with forecast, account creation, location editing, thermostat editing, adding locations, adding thermostats, sensor information, and remote set up.

Figure 6:
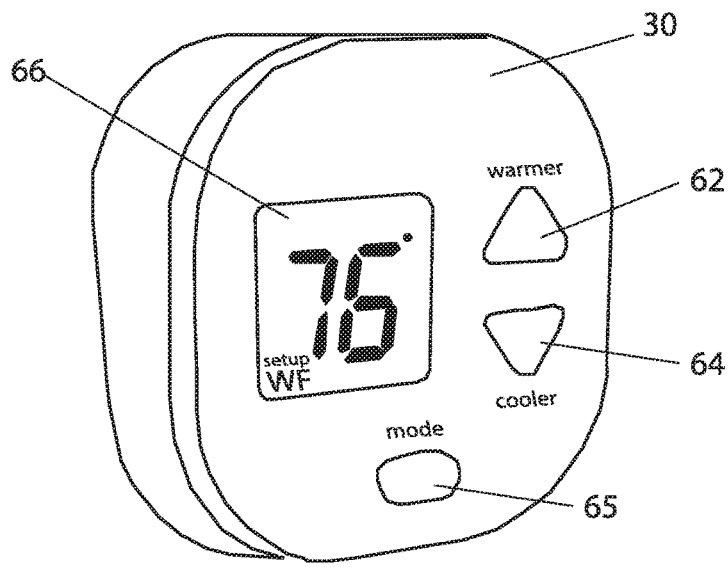
FIG. 6 illustrates an exemplary embodiment showing an example Wi-Fi setup operation.
Figure 9:
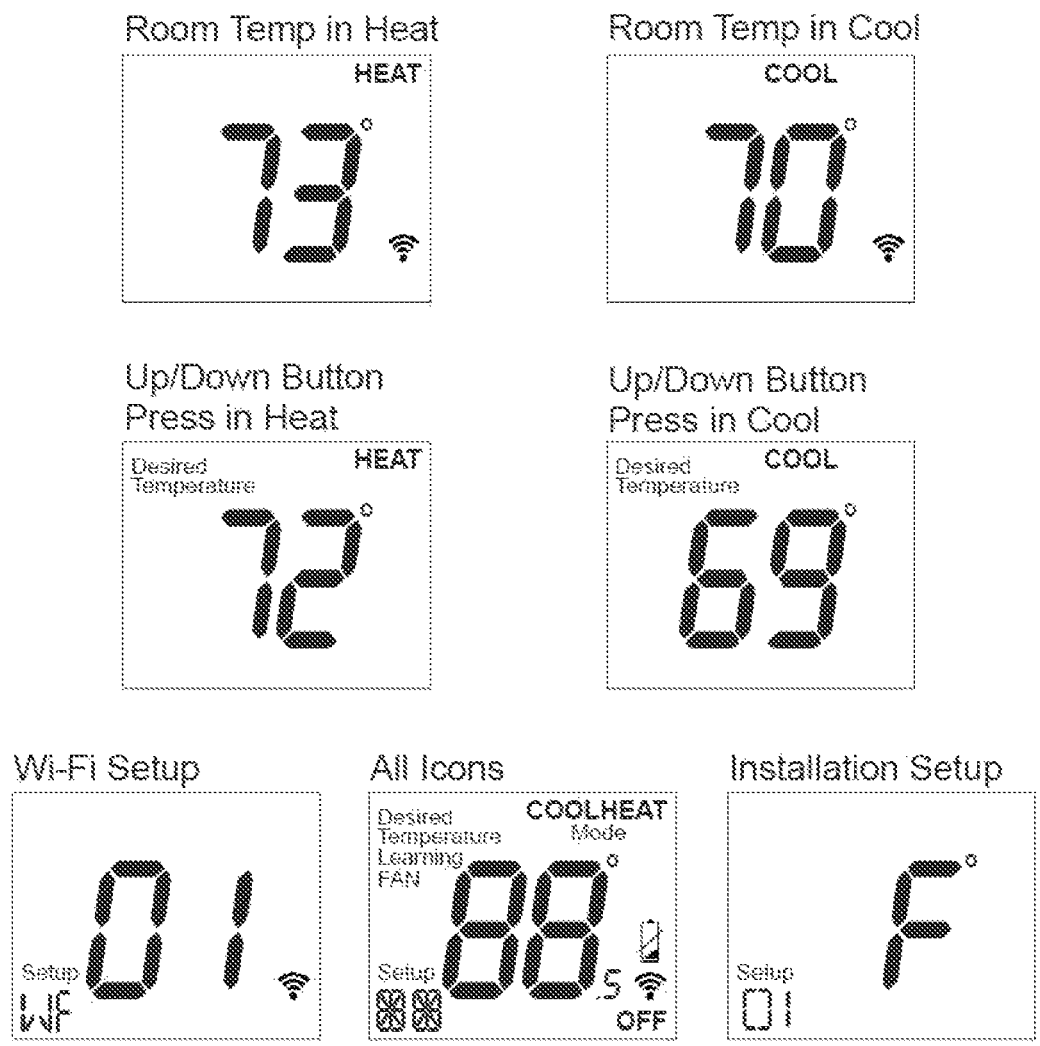
FIG. 9 illustrates examples of the display screen indications and icons of an exemplary embodiment.

FIG. 6 illustrates an exemplary embodiment showing an example Wi-Fi setup operation. FIG. 9 illustrates examples of the display screen indications and icons of an exemplary embodiment. The operation of the exemplary embodiment may include Wi-Fi and Skyport set up. Skyport may allow, for example, a user to communicate via the smartphone app over the Internet with the cloud server. To enter Wi-Fi set up, for example, the warmer button 62 and mode button 65 are pressed together for five seconds.

The smartphone app is used to select "set up Wi-Fi." Both the mode and warmer buttons 65, 62 are then pressed at the same time on the mini split controller 30 for five seconds to enter Wi-Fi set up. "Set up Wi-Fi" then appears on the display 66 of the controller 30, with an indication of the controller's identification number. On the smartphone app, the user can then select "Continue."

If there is just one mini split controller 30 available, that controller will connect automatically. If there are more than one mini split controllers on the local network, the user can then select from the smartphone app the unit with the identification number that matches the identification number displayed on the mini split controller 30.

The user is then prompted to select the local network on the smartphone app and enter the password for the selected local network.

The user is then prompted to select "Join" on the smartphone app and, if successful, a full symbol will appear on the display 66 of the mini split controller 30.

The user is then prompted to sign in to a Skyport account. If a Skyport account has not been set up, the user is prompted to set up a new account and prompts are provided to set up the account.

The user is then prompted to select a location (or create a location if needed) to add the mini split controller 30.

Installation Set Up

Figure 7:
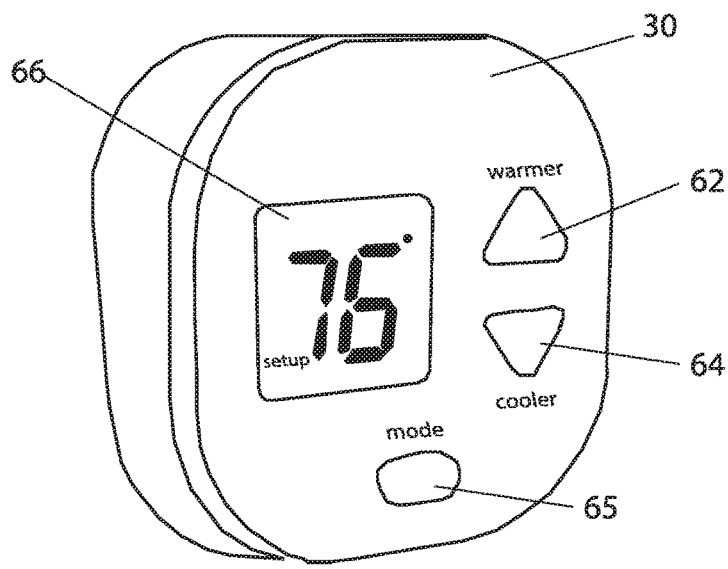
FIG. 7 illustrates an exemplary embodiment showing an example installation set up operation.

FIG. 7 illustrates an exemplary embodiment showing an example installation set up operation. To access advanced setup steps, the user will press and hold together for five seconds the warmer button 62 in the cooler button 64. "Set up" will appear on the display 66 of the mini split controller 30. These advanced set up steps may be accessed from the mini split controller 30 or from the smartphone app.

Using the warmer or cooler button 64, the user can select the temperature display 66 to be degrees F. or C. The mode button 65 is pressed to advance to the next step.

A table can be provided in a printed manual or from an online source to locate the equipment model for the mini split controller 30 that is being set up. The cooler and warmer buttons 62, 64 can then be used to enter the code associated with the mini split from controller 30 from the table. The mode button 65 is again pressed to advance to the next step, and the warmer or cooler buttons 62, 64 can again be used to sign a different ID number.

To exit insulation set up, the simultaneous pressing of the warmer and cooler buttons 62, 64 is repeated, or left alone with the mini split controller 30 will time out and return to normal operation 20 seconds after the last button press.

Learning Mode

Figure 8:
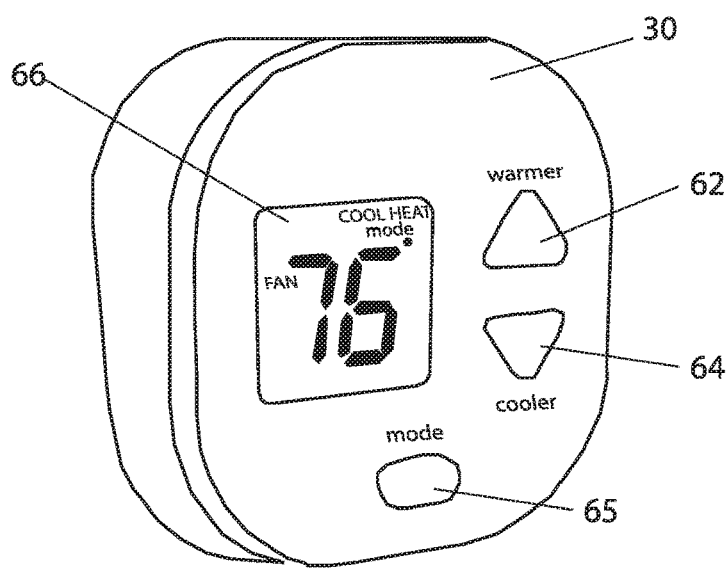
FIG. 8 illustrates an exemplary embodiment showing an example learning mode operation.

FIG. 8 illustrates an exemplary embodiment showing an example learning mode operation. Learning mode may be used if the mini split controller 30 model is not listed in the table. Learning mode allows the mini split controller 30 to be taught how to operate with the corresponding environmental control system. To enter learning mode, both the cooler button 64 and mode button 65 are pressed together for five seconds. "Learning" will appear on the display 66 of the controller 30.

The "Heat" icon on the display 66 with flash, then with the mini split original remote control aimed at the learning window, the warmer button 62 is pressed on the remote control. When the mini split controller 30 successfully receives this command, the "Heat" icon will stop flashing. The mode button 65 is pressed to advance to the next step.

The "Cool" icon on the display 66 will flash. With the mini split original remote control aimed at the learning window, the cooler or down button is pressed on the remote control. When the mini split controller 30 successfully receives this command the "Cool" icon on will stop flashing. The mode button 65 is again pressed to advance to the next step.

The "Mode" and "Heat" icons on the display 66 will then flash. With the mini split original remote control aimed at the learning window, the heat mode button 65 is pressed on the remote control. When the mini split controller 30 successfully receives this command the "Heat" icon on the display 66 will flash for four seconds and disappear. The mode button 65 is pressed again to advance to the next step.

The "Mode" and "Cool" icons on the display 65 will flash With the mini split original remote control aimed at the learning window, the cool mode button 65 is pressed on the remote control. When the mini split controller 30 receives this command the "Cool" icon on the display 66 will flash for four seconds and then disappear. The mode button 65 is again pressed to advance to the next step.

"Mode" and "Fan" icons on the display 66 will flash. With remote controller 30 aimed at the learning window, the fan button is pressed on the remote control. When the mini split controller 30 successfully receives this command the "Fan" icon on the splay will flash for four seconds then disappear.

To exit learning mode the simultaneous pressing of the cooler and mode buttons 64, 65 is repeated, or left alone the mini split controller 30 will time out and returned to normal operations 20 seconds after the last button press.

In another non-limiting, exemplary embodiment, a single unit omni-directional, IR blasting optical signal source is provided that is Wi-Fi enabled. In another non-limiting, exemplary embodiment, a two-piece unit consists of a Wi-Fi enabled optical signal source that broadcasts Bluetooth to a battery powered receiver that is mounted on the mini split controller 30 with an integral IR flasher.

This embodiment may also include a plug-in power adaptor for a tabletop controller 30.

Both of these embodiments have the ability to be both uploaded/set up with a profile of IR codes from a smartphone app/cloud network connection, or locally through the use of button presses and/or in a learning mode from an existing remote IR controller 30, similar to the description above.

The IR remote controller 30 associated with a wirelessly controlled equipment 14 (e.g., an IR controlled thermostat of a heat pump 14) can be used as the source of IR codes for teaching the mini split controller 30.

Further, it is contemplated that an algorithm may be provided to prevent conditions such as "runaway heat." In this case, the algorithm controls the mini split controller 30 to monitor current ambient temperature measured by a sensor onboard the mini split controller 30 or from telemetry received from the wirelessly controlled equipment 14. This "runaway heat" scenario is an example feedback system that enables the inventive apparatus, method and computer program product to control, for example a pre-existing wirelessly controllable equipment, such as a thermostat, to be controlled via a smartphone/cloud/Internet/and/or/local area network communication system and provide enhanced operations that may not have been available through conventional operation of a pre-existing or retrofitted wirelessly controlled equipment 14.

The algorithm, for example, may monitor the current ambient temperature measured at the thermostat while timing the local temperature changes. The algorithm may also be aware of a preset mode of the thermostat, and limits or caps employed in time and/or temperature to prevent undesired operational results. This inventive feature may help prevent, for example, anomalies produced from missed IR control signal transmission or if a set point is inadvertently incremented or decremented.

Figure 10:
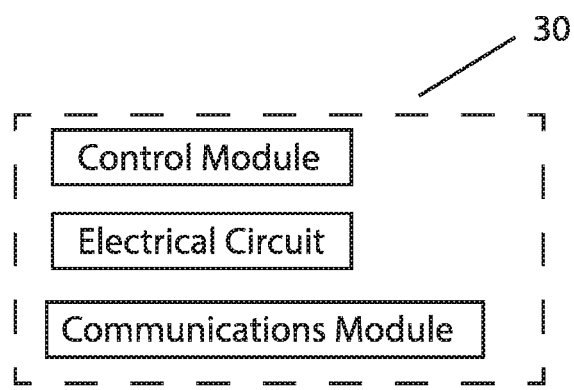
FIG. 10 is a block diagram showing the constituent parts of an exemplary embodiment of the inventive controller.

FIG. 10 is a block diagram showing the constituent parts of an exemplary embodiment of the inventive controller.

In accordance with an aspect of the invention, an apparatus comprises a control module comprising an optical source for generating an optical control signal. The control module enables a smartphone 44 to control wirelessly controlled equipment 14 of the type which is controlled by a remote-control device generating an optical signal. An electrical circuit generates electrical control signals to be coupled to the optical source, wherein the electrical circuit generates the electrical control signals depending on information received from a network connection. A wireless communications module communicates with the smartphone 44. A mobile application stored in a memory of the smartphone 44 communicates user selections from the smartphone 44 over the network connection to the apparatus to implement transmission of electrical control signals to the control module to cause the control module to cause the optical source to generate the optical control signals to control the operation of the wirelessly controlled equipment 14.

The network connection may include an Internet connection. The smartphone 44 may be configured to communicate the user selections from the smartphone 44 over the Internet to a cloud server. Cloud server software resident in a memory of the cloud server controls the cloud server in response to command signals, received over the internet from the smartphone 44, to implement transmission of the electrical control signals from the cloud server over the Internet to the control module to cause the control module to cause the optical source to generate optical control signals to control the operation of the wirelessly controlled equipment 14.

The memory of the smartphone 44 may store a library of control signals for wirelessly controlling a plurality of different wirelessly controlled equipment 14. The mobile application may receive a user selection indicating a selected wirelessly controlled equipment 14 of the plurality of different wirelessly controlled equipment 14 and communicates the selection to the wireless communications module to implement transmission of control signals corresponding to the selected wirelessly controlled equipment 14.

The wirelessly controlled equipment 14 may be a ductless air conditioning system. The ductless environmental control system can be a pre-existing environmental control system. The apparatus can be retrofittable to the pre-existing environmental control system to enable smartphone 44 control of the pre-existing environmental control system via the transmission of control signals from the cloud server over the Internet to the control module.

The memory of the cloud server can store a library of control signals for wirelessly controlling a plurality of different environmental control systems. The mobile application receives a user selection indicating a selected environmental control system of the plurality of different environmental control systems and communicates the selection to the cloud server to implement transmission of control signals corresponding to the selected environmental control system.

The memory of the cloud server can store preferences of the user for automatically controlling the ductless environmental control system depending on the stored user preferences. The optical source can comprise a plurality of light emitting devices for emitting the optical control signal having a hemispherical emission pattern.

A sensor can be provided for measuring at least one ambient parameter. The control module may cause the optical source to generate optical control signals to control the operation of the wirelessly controlled equipment 14 dependent on the measured at least one ambient parameter. The network connection can be a local area network and the wireless communications module may communicate with the smartphone 44 via the local area network.

In accordance with another non-limiting exemplary embodiment, a method includes controlling an optical source for generating an optical control signal to enable a smartphone 44 to control wirelessly controlled equipment 14 of the type which is controlled by a remote-control device generating an optical signal. Control signals are generated to be coupled to the optical source. The control signals are generated depending on information received from a network connection. The smartphone 44 is communicated with, where a mobile application stored in a memory of the smartphone 44 communicates user selections from the smartphone 44 over the network connection to cause the generation of the electrical control signals to cause generating the optical control signals to control the operation of the wirelessly controlled equipment 14.

In accordance with another non-limiting exemplary embodiment, a computer program product comprises a non-transitory computer readable storage medium having computer-readable code embodied thereon. The computer-readable code is executable by an apparatus and causing the apparatus, in response to execution of the computer-readable code, to perform at least controlling an optical source for generating an optical control signal enabling a smartphone 44 to control wirelessly controlled equipment 14 of the type which is controlled by a remote-control device generating an optical signal; generating control signals to be coupled to the optical source, wherein the control signals are generated depending on information received from a network connection; and communicating with the smartphone 44, wherein a mobile application stored in a memory of the smartphone 44 communicates user selections from the smartphone 44 over the network connection to an apparatus to implement transmission of the control signals to cause generating the optical control signals to control the operation of the wirelessly controlled equipment 14.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain, store, and/or transport the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed:

1. A system for remotely controlling an infrared controlled HVAC system by a computing device configured to be positioned in a second location and in data communication with a wireless network, the infrared controlled HVAC system being installed in a first location, the infrared controlled HVAC system comprising an infrared detector directed toward an interior space and configured to receive an infrared control signal from a standard remote control, the system comprising:

a cloud server controlling an infrared controlled HVAC system by a computing device;

a controller configured to be positioned within the interior space of the second location as a replacement to the standard remote control at least part-time, the controller comprising:

a microprocessor with a hardware processor and a memory;

a wireless network interface controller providing data communication between a wireless network and the microprocessor; and an infrared transmitter controlled by the microprocessor and configured to be selectively in optical data communication with an infrared detector of the infrared controlled HVAC system;

a sensor for measuring an ambient parameter;

wherein the controller periodically interrogates the sensor for the ambient parameter, the controller sending the ambient parameter to the cloud server;

wherein the infrared controlled HVAC system is a pre-existing environmental control system, and wherein the controller is retrofittable to the pre-existing environmental control system to enable a computing device control of the pre-existing environmental control system via transmission of control signals from the cloud server over the Internet to the controller;

wherein a HVAC control signal is received by the controller from the computing device through the wireless network, the HVAC control signal containing an HVAC command;

wherein infrared control signals are transmitted by the infrared transmitter to the infrared detector of the infrared controlled HVAC system;

wherein the ambient parameter is a temperature, the sensor is a temperature sensor, a setting of the infrared controlled HVAC system being controlled to maintain a temperature set point of the temperature sensor; and, wherein the system monitors the temperature sensor to determine if the infrared controlled HVAC system has entered a runaway heat scenario, the system controlling the infrared controlled HVAC system to prevent undesired operational results.

2. The system of claim 1 wherein the infrared transmitter comprises a ring of light emitting diodes.

3. The system of claim 1 wherein the infrared transmitter comprises an omni-directional, IR blasting optical signal source.

4. The system of claim 1 wherein the infrared transmitter is one of a plurality of infrared transmitters arranged in a radial array to permit emission of the infrared control signals in a plurality of directions.

5. The system of claim 1 wherein the infrared transmitter is one of a plurality of infrared transmitters arranged to emit the infrared control signals in a hemispherical emission pattern.

6. The system of claim 1 wherein the computing device is in data communication with the cloud server via the Internet, the controller being in data communication with the cloud server through a local area network connected to the Internet.

7. The system of claim 1 wherein the wireless network is one or a combination of one or more of a local area network, an intranet, and the Internet.

8. The system of claim 1 wherein the controller is mounted within an enclosure.

9. The system of claim 1 wherein the infrared transmitter is mounted on the infrared controlled HVAC system and is in wireless communication with the microprocessor.

10. The system of claim 1 wherein an infrared transmitter unit comprises a remote infrared transmitter, the infrared transmitter unit being in wireless communication with the microprocessor.

11. The system of claim 1 wherein the infrared controlled HVAC system is a ductless air conditioning system.

12. The system of claim 1 wherein the controller locally stores IR codes.

* * * * *